May 20, 1958 I. F. PROAPS 2,835,778
PRESSURE DISTRIBUTING PAD
Filed Oct. 19, 1956 2 Sheets-Sheet 1

IRWIN F. PROAPS
*INVENTOR.*

BY *Hubert Miller*
ATTORNEY

May 20, 1958     I. F. PROAPS     2,835,778
PRESSURE DISTRIBUTING PAD

Filed Oct. 19, 1956     2 Sheets-Sheet 2

IRWIN F. PROAPS
*INVENTOR.*

BY

ATTORNEY

2,835,778

PRESSURE DISTRIBUTING PAD

Irwin F. Proaps, Wichita, Kans., assignor to Center Line Manufacturing Co., Inc., Wichita, Kans., a corporation of Kansas Application October 19, 1956, Serial No. 617,094

10 Claims. (Cl. 219—19)

This invention relates generally to pressure distributing pads, and pertains more particularly to such a pad for applying substantially uniform pressure to uneven or irregular surfaces.

Various needs exist for the application of relatively uniform pressure to a given surface. The problem is greatly aggravated where the surface is uneven or irregular in contour. For instance, in the vulcanizing of tires, the tire tread presents a surface posing a special problem. Somewhat less severe irregularities are encountered in wood working operations and other types of work.

Accordingly, the primary object of the invention is to provide a pressure distributing pad that will be of utility in applying substantially uniform pressure to diverse types of uneven surfaces, including those specifically mentioned above.

Another object is to provide a pressure distributing pad of the foregoing character that is also capable of applying heat to the uneven surface with a good degree of conductive dispersion.

Another object of the invention is to provide a pressure distributing pad that is constructed as a unit, thereby facilitating its handling and use.

A further object of the invention is to provide a pressure pad capable of transmitting appreciable magnitudes of pressure even though it is readily conformable to irregular faces.

Yet another object is to provide a pressure distributing pad that will be long lasting, the invention envisaging little or no need for replacement of any parts.

The invention, together with other objects attending its production, will be more clearly understood when the following description is read in connection with the accompanying drawings, in which.

Figure 1:
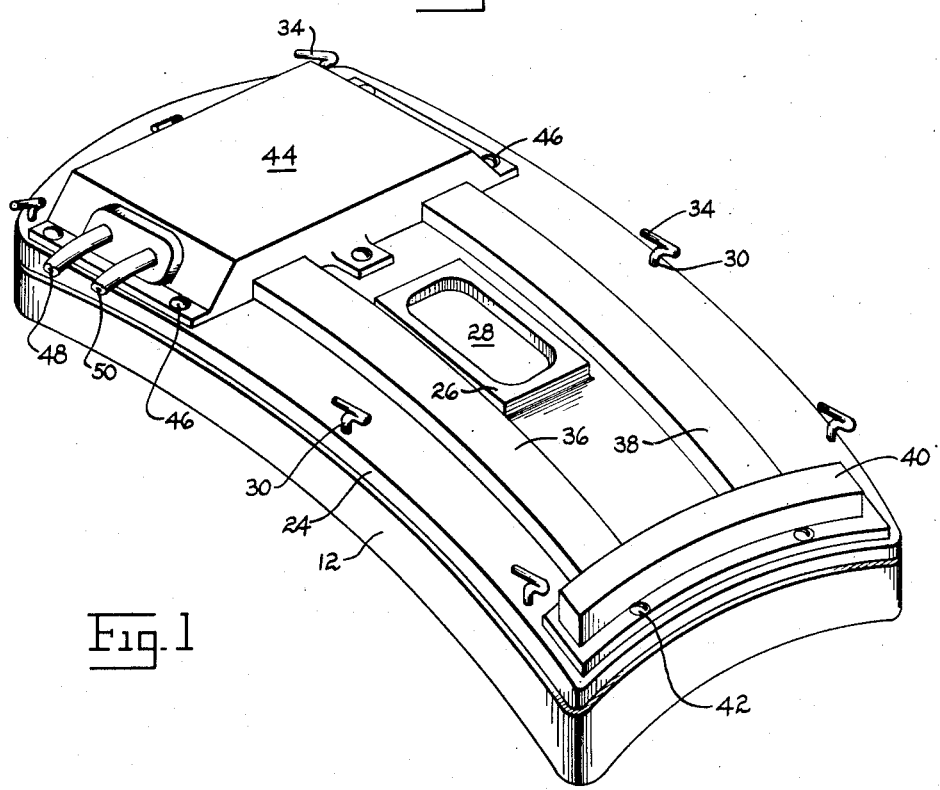
Figure 1 is a perspective view illustrating the invention embodied in a double curvature vulcanizing pad, this embodiment including a pair of strip heating elements.
Figure 4:
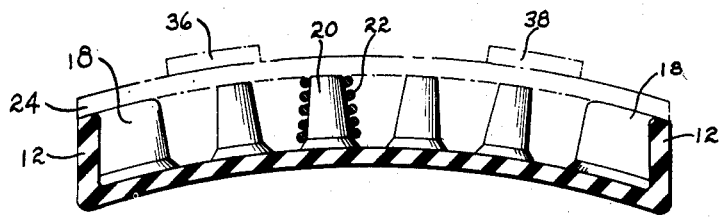
Figure 4 is a sectional view taken in the direction of line 4—4 of Figure 3.
Figure 3:
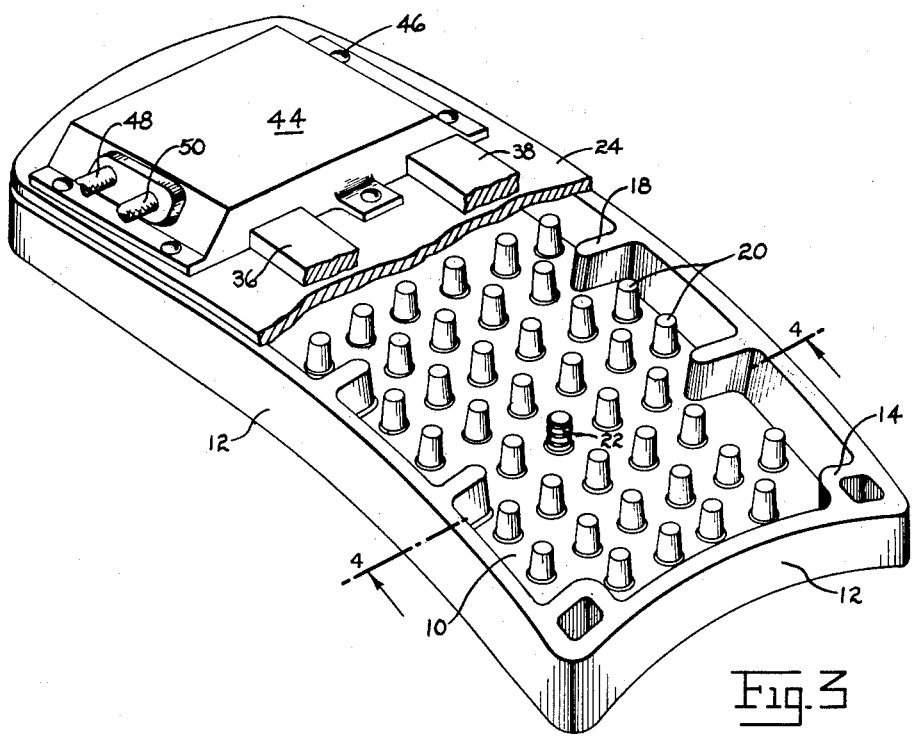
Figure 3 is a perspective view corresponding to Figure 1 but with a portion of the rigid pressure plate removed.

Referring first to the embodiment depicted in Figures 1, 3 and 4, it is to be noted that this pressure distribution pad comprises a flexible rubber base pad 10 provided with an upstanding wall or rim 12 extending peripherally thereabout. At each corner of the base 10 the wall 12 is reinforced by inwardly projecting wall sections 14 which leave a vertical space 16. Also, additional reinforcing means are provided at spaced locations along the length of the base 10 in the form of inwardly projecting wall fingers 18. Still further, the base 10 is provided with a plurality of upstanding integral protuberances 20 of frusto-conical configuration. In other words, these protuberances have sloping or tapering sides rendering them narrower at the top than bottom. It will be recognized that the base 10, together with its walls, reinforcements and protuberances can be molded in one piece.

From Figures 3 and 4 it will be perceived that each protuberance 20 is intended to have a stiff compression spring 22 of metal surrounding it, although only one such spring has been shown in Figures 3 and 4. The function of these springs 22 is two-fold: First they supplement the action of the deformable or compressible protuberances in transmitting pressure to the flexible base 10, and secondly they serve as heat conductive media. It is believed, however, that the above reasons for the springs 22 will be better understood as the description progresses.

The peripheral wall 12 and the protuberances 20 are all of equal height. Abutting the upper ends of said wall 12 and protuberances 20 is a metallic pressure plate 24, preferably of aluminum. The plate 24 also contacts the upper ends of the various coil springs 22, as can be seen in Figure 4. In order to apply pressure to the plate 24 by means of a plunger, the plate is thickened at its center as designated by the numeral 26. This thickened section 26 is formed with a recess 28 to form a seat for the accommodation of the plunger end (not shown).

Inasmuch as it is contemplated that the embodiment of Figures 1, 3 and 4 will be used in the vulcanizing of automobile tires the flexible base 10 is molded so that it is arcuate, both longitudinally and transversely. Similarly, the plate 24 is curved so that it will be supported by the wall 12 as well as the multiplicity of protuberances 20, which as stated above are of equal height as measured from the flexible base 10.

In order to restrain the plate 24 for movement in a reciprocal path relative to the flexible base 10 a number of guide rod elements 30 are utilized. Each guide 30 is equipped with an enlarged head 32 (visible only in the embodiment of Figure 2) embedded in the rubber material forming the flexible base 10. Additional anchorage is provided by having the guides 30 extend vertically upwardly through certain of the protuberances 20. By coating the shanks of these guides 30 prior to the molding process, the rubber does not bond thereto, thus allowing free movement when pressure is applied to the upper side of the plate. The guides 30 also extend freely through apertures provided in the rigid plate 24. The upper ends of these guide rods 30 are bent laterally at 34 so as to preclude detachment of the plate. Thus, a unitary structure is produced, yet the plate 24 is free to compress the protuberances 20 as well as the wall 12 and its reinforcements 14, 18.

When embodied in a tire vulcanizing pad, as we are here dealing with, it is necessary to heat the plate 24. Therefore a pair of spaced strip heating elements 36, 38 are secured to the upper side of the plate. A clamp 40 holds the heaters in place at one end, being attached to the plate by screws 42, and a housing 44 supplies this function at the other end, additional screws 46 anchoring the housing to said plate. Within the housing 44 is a thermostat in circuit with the electric heaters 36, 38 and a pair of conductors 48, 50. The conductors 48, 50 of course are connected to a suitable power source in order to energize the heaters.

Figure 2:
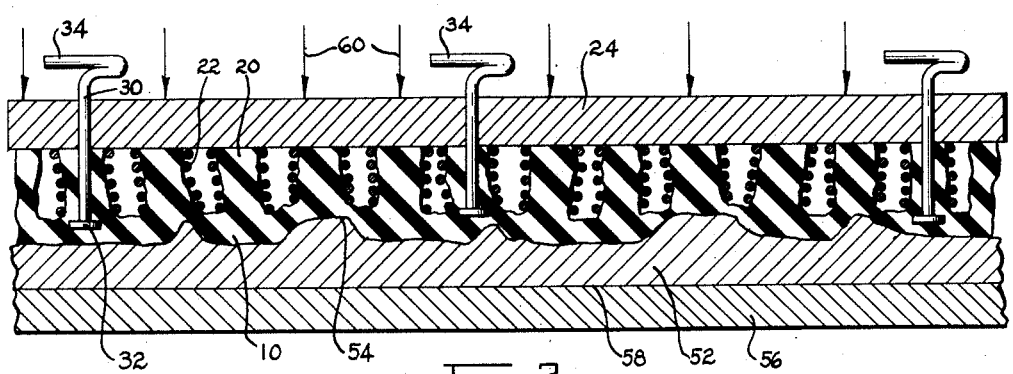
Figure 2 is illustrative of a simpler form that the invention may take, the view being in section so as to depict better the internal construction of the pad.

In Figure 2 the invention has been pictured in a form where no heating elements are involved. Although the heating elements are lacking, the depicted structure is basically the same and therefore the same numerals have been applied. Here, though, it is contemplated that a work piece 52 having a very irregular upper surface 54 be cemented or bonded to another work piece 56 at 58 so the plate 24 would be planar in character in contradistinction to its arcuate configuration when vulcanizing tires. Due to the unevenness of the upper surface of the work piece 52, it can be understood that a poor bond will result if the pressure is not uniformly applied. However, the flexible base 10 is deformable so as to conform to the irregularities existing on the upper side 54 of the work piece 52.

Actual use of the pressure distributing pad is illustrated in Figure 2, downward pressure being exerted against the rigid plate 24 as indicated by the parallel arrows labeled 60. Owing to the freedom of movement permitted between the plate 24 and the guides 30 the plate is forced to move toward the flexible base 10, compressing both the protuberances 20 and their surrounding springs 22. Since the protuberances 20 are distorted to various degrees dependent upon the contour 54 of the work piece 52 they will be deformed from their natural frusto-conical shape to whatever extent is necessary to transmit the pressure applied to the plate 24.

While in the strictest sense the pressure transmitted to the surface 54 of the work piece 52 is not precisely the same at every point, nonetheless it can be appreciated that such pressure is generally uniform over this uneven area. As a result good permanent adhesion between the work pieces 52 and 56 is assured.

A special word should perhaps be given relative to the operation of the embodiment of Figures 1, 3 and 4. Although the pressural action is the same as with that of Figure 2, there is a relatively good transfer of heat to the flexible base 10. Such transfer is effected from the plate 24 via the plurality of metallic springs 22. Hence, while the rubber protuberances 20 constitute a relatively poor heat conductive path because of their material and length, the presence of the metallic springs 22 provide numerous paralleling paths over which heat may flow. Therefore, it is believed readily apparent that the springs 22 fulfill two purposes, i. e., aiding in the transmission of pressure and the concomitant establishment of plural heat conductive paths. Because the flexible base 10 is quite thin, the heat conducted thereto will be transmitted therethrough, even though the rubber of which the base is made is not per se a good heat conductor. Stated somewhat differently, the course over which the heat travels has had that portion thereof which is resistive to thermal flow reduced to an extent where it imposes no real problem.

Having described the invention with sufficient clarity to enable those familiar with this art to construct and use it, I claim:

1. A pressure distributing pad comprising: a molded rubber pad provided with a plurality of upstanding integral protuberances on its upper surface; a metallic coil spring surrounding each protuberance; a rigid metallic pressure plate bearing against the upper ends of said protuberances and said springs; a plurality of upstanding rod elements having their lower ends embedded in said rubber pad and their upper ends passing freely through said plate so that said plate may be moved toward and away from said rubber pad; and a pair of electrical strip heaters confronting the upper surface of said plate.

2. A pressure distributing pad in accordance with claim 1 in which the center portion of said plate is thickened, said thickened portion having an upwardly facing recess forming a seat for a pressure applying plunger.

3. A composite unitary pad for evenly distributing and applying pressure over an irregularly contoured surface comprising: a base of flexible compressible material having one normally smooth surface which is deformable under pressure to generally conform to the irregularly contoured surface to which pressure is to be applied, the opposed surface of said base being in the form of a plurality of spaced integral upstanding protuberances; a rigid pressure transmitting plate having one surface in contact with the protuberances on said base and movable under pressure applied to the opposite surface thereof to transmit and distribute that pressure through said protuberances toward and to the normally smooth surface of the base to cause it to conform generally to the irregularly contoured surface to which pressure is to be applied; and means carried by the base and cooperating with said plate for guiding the movement of the plate toward the smooth surface of the base and for connecting the plate and base together as a unit.

4. The pad described in claim 3 and means for heating said rigid plate; and a plurality of compressible heat conductive elements between and respectively in contact with the adjacent surfaces of the plate and base for transmitting heat from one to the other.

5. The pad described in claim 4 in which the means for heating the plate is an electrical heating element carried by and secured to the plate.

6. The pad described in claim 4 in which one of the said protuberances is in the form of an integral upstanding continuous wall extending around the base adjacent the periphery thereof, the free edge of said wall being in contact with the adjacent surface of the plate to enclose the space therebetween.

7. The pad described in claim 3 and a plurality of coil springs under compression between the plate and base, the opposite ends of said springs bearing against the adjacent surfaces of the plate and base.

8. The pad described in claim 4 in which certain of said protuberances of the base are of a shape to be encompassed by said springs, and the springs surround and encompass those protuberances and are maintained in their relative positions by said protuberances.

9. A composite unitary pad for evenly distributing and applying pressure over an irregularly contoured surface comprising: a base of flexible and compressible material having one normally smooth surface, portions of the opposed surface thereof carrying integral spaced upstanding protuberances of the same material; a rigid pressure transmitting plate having one surface bearing against the free ends of said protuberances; coil springs under compression surrounding certain of said protuberances, the opposite ends of said springs bearing respectively against the plate and base; and means carried by and associated with the plate and base for connecting the two together and for restraining the plate for limited reciprocal movement in a direction generally toward and away from said base.

10. The pad described in claim 9 and a heating element carried by and secured to the plate.

References Cited in the file of this patent

UNITED STATES PATENTS

| | | |
|---|---|---|
| 1,704,413 | Wait | Mar. 5, 1929 |
| 1,805,026 | State | May 12, 1931 |
| 1,844,505 | Heintz | Feb. 9, 1932 |
| 1,966,949 | Goldstein | July 17, 1934 |
| 2,152,365 | Smith | Mar. 28, 1939 |
| 2,317,676 | Dorsey | Apr. 27, 1943 |
| 2,653,645 | Frazier | Sept. 29, 1953 |
| 2,689,903 | Radley | Sept. 21, 1954 |